United States Patent
Zhang et al.

(10) Patent No.: US 7,028,128 B2
(45) Date of Patent: Apr. 11, 2006

(54) PORT REPLICATION IN AN ELECTRONIC DEVICE THAT ALLOWS FOR A SINGLE NETWORK CONTROLLER

(75) Inventors: Tim Zhang, Spring, TX (US); Robert Hurbanis, Jr., Tomball, TX (US); Richard Lin, Houston, TX (US); Jeff Jeansonne, Houston, TX (US); John Chow, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 10/060,727

(22) Filed: Jan. 30, 2002

(65) Prior Publication Data

US 2003/0145148 A1    Jul. 31, 2003

(51) Int. Cl.
*G06F 13/14*    (2006.01)
(52) U.S. Cl. .................... 710/305; 710/303; 710/38; 361/139
(58) Field of Classification Search ............. 710/303, 710/304, 38; 709/100, 200; 361/139
See application file for complete search history.

(56) References Cited

U.S. PATENT DOCUMENTS

| | | | | |
|---|---|---|---|---|
| 5,371,858 A | * | 12/1994 | Miller et al. ............... | 709/222 |
| 5,488,572 A | * | 1/1996 | Belmont .................... | 710/62 |
| 5,526,493 A | * | 6/1996 | Shu ........................... | 710/304 |
| 5,596,728 A | * | 1/1997 | Belmont .................... | 710/304 |
| 5,598,539 A | * | 1/1997 | Gephardt et al. ........... | 710/304 |
| 5,664,118 A | * | 9/1997 | Nishigaki et al. .......... | 710/304 |
| 5,748,911 A | * | 5/1998 | Maguire et al. ............ | 710/303 |
| 5,859,970 A | * | 1/1999 | Pleso ........................ | 709/250 |
| 5,864,702 A | * | 1/1999 | Walsh et al. ............... | 713/320 |
| 5,930,110 A | * | 7/1999 | Nishigaki et al. .......... | 361/686 |
| 5,935,226 A | * | 8/1999 | Klein ........................ | 710/303 |
| 6,170,028 B1 | * | 1/2001 | Wallach et al. ............ | 710/302 |
| 6,256,691 B1 | * | 7/2001 | Moroz et al. .............. | 710/303 |

(Continued)

OTHER PUBLICATIONS

James Chellis, Charles Perkins, and Matthew Strebe, "MSCE: Networking Essential Study Guide", 1997, Sybex Inc., pp 121-123 and 155.*

(Continued)

*Primary Examiner*—Rehana Perveen
*Assistant Examiner*—Justin King

(57) ABSTRACT

A method and apparatus are disclosed for allowing a plurality of network connectors to utilize a single network controller within a docking station or portable device. A switching device connects the plurality of network connectors with the network controller. By connecting the network connectors into the switching device, the docking station and the portable device require a single network controller to handle the network communication. The switching device enables the network controller to continue to operate without disrupting the portable device when the network connection is changed from the docking station to the portable device or vice versa. The method and apparatus are useful in reducing the complexity of the total system while increasing functionality.

20 Claims, 4 Drawing Sheets

U.S. PATENT DOCUMENTS

| | | | |
|---|---|---|---|
| 6,400,715 B1 * | 6/2002 | Beaudoin et al. | 370/392 |
| 6,405,049 B1 * | 6/2002 | Herrod et al. | 455/517 |
| 6,425,040 B1 * | 7/2002 | Dewa et al. | 710/303 |
| 6,636,904 B1 * | 10/2003 | Fry et al. | 710/8 |
| 6,694,440 B1 * | 2/2004 | Ishibashi | 713/310 |
| 6,754,692 B1 * | 6/2004 | Cruz | 709/203 |
| 6,757,725 B1 * | 6/2004 | Frantz et al. | 709/223 |
| 2001/0052042 A1 * | 12/2001 | Wallach et al. | 710/103 |
| 2002/0007432 A1 * | 1/2002 | Ahem | 710/305 |
| 2003/0084192 A1 * | 5/2003 | Nguyen et al. | 709/250 |

OTHER PUBLICATIONS

Jae Min Lee, Wook Hyun Kwon, Young Shin Kim, and Hong-Ju Moon, "Physical Layer Redundancy Method for Fault-Tolerant Networks", 2000,Factory Communication System 2000, IEEE International Workshop.*

* cited by examiner

PORT REPLICATION IN AN ELECTRONIC DEVICE THAT ALLOWS FOR A SINGLE NETWORK CONTROLLER

BACKGROUND OF THE INVENTION

1. Field of the Invention

The present invention relates generally to a portable computing device and, more particularly, to a technique and apparatus for connecting a network to a portable computing device.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many portable devices are composed of electronic components housed in a portable unit that is capable of being connected to a docking station or master housing unit. For example, a portable computer system typically includes a microprocessor, hard drive, RAM, network connection, and power supply housed within a protective housing. The portable device may be connected with the docking station or operated independently of the docking station. The portable device and docking station are typically a computer laptop with the associated base docking station, but may be a handheld device, pager, cell phone, or other similar device. The coupling between the docking station and the portable device may be configured in a variety of ways. The typical connection between the systems utilizes a copper port. However, the connection may be wireless or optical as well.

While the portable device may typically be an independent system, connecting to the docking station and other peripheral attachments may be a beneficial feature to the user. When the portable device is connected to the docking station, the portable device controls the peripheral attachments connected to the docking station. The docking station is typically coupled to a monitor, keyboard, printer, scanner, mouse, or other peripheral devices. Through the docking station connection, the user may access the beneficial features of the peripheral attachments that are removed from the portable device to increase its mobility.

Another type of external connection that is most often useful to the user is a network connection. An Ethernet, token ring, FDDI, wireless, ATM, or other proprietary or protocol based communication system are typical networks to which a user may connect. The user may need to connect the portable device in a variety of locations. To facilitate this freedom, the portable device will need to have a network connection within the unit. However, the portable device may be more difficult to operate since many of the user interfaces are smaller, such as the screen, keyboard, and mouse. When the user is working in the same location, a docking station may be used to allow the access to the peripheral devices connected to the docking station, such as a monitor, a mouse, a scanner, a printer, or a keyboard. With the docking station, a single connection is needed to connect the portable device into the docking station. If the portable device is the only device that has the network connector, then an additional action would be required to connect the portable device to the network. In other configurations, the docking station will have the network connector and the portable device would have to be connected to the docking station to enable network access. A final configuration includes both the portable device and the docking station having a network connector. With a network connection in both systems, the user does not have the concern of finding a network cable or the added effort in connecting the network into the portable device. Furthermore, the portable device is able to connect at a variety of locations and communicate with other network attached devices. In this configuration, the portable device retains its mobility and simplicity of connectivity with the docking station.

To enable the additional functionality in a dual network connector configuration, the docking station and the portable device must each have a network interface. Within a system, the network interface typically includes of a physical layer interface and a network controller. The network controller communicates with the system and physical layer interface through its physical connections to these components. In connecting the system to the network, the physical layer interface allows the network controller to communicate on the network media. The physical layer interface includes a physical layer controller and a network connector. The physical layer controller handles the communication from the network connector and the network controller. The network connector makes the physical connection with the network media to allow signals to flow from the network to the system. The network connector is typically copper, but may be optical or wireless.

Of the issues raised by additional hardware, cost and complexity are the biggest area of concern. With each system requiring duplicate hardware, the cost of the overall system increases with each hardware component that is duplicated. In addition, the cost of the associated support labor attributed to the additional components raises the system cost. In the area of complexity, the plurality of network connectors requires each network connector to have an individual hardware configuration that adds to the complexity of the software within the portable device. Along with the software complexity, problems resulting from the testing of the portable device are increased with each component. Also, the network configuration is not adjustable during the real-time operation of the portable device. The change from one network connector to another network connector requires the portable device be shutdown and restarted to accept the network connector change. The requirement of restarting the portable device is not a desirable situation for the user. Another aspect of complexity is that no feasible solution exists for routing the analog output of the physical interface to the plurality of network connectors.

Therefore, it would be advantageous to have a single network controller that the portable device or docking station shares for any access to the network, without the need for additional network controllers to be housed within the docking station or portable device.

BRIEF DESCRIPTION OF THE DRAWINGS

The foregoing and other advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
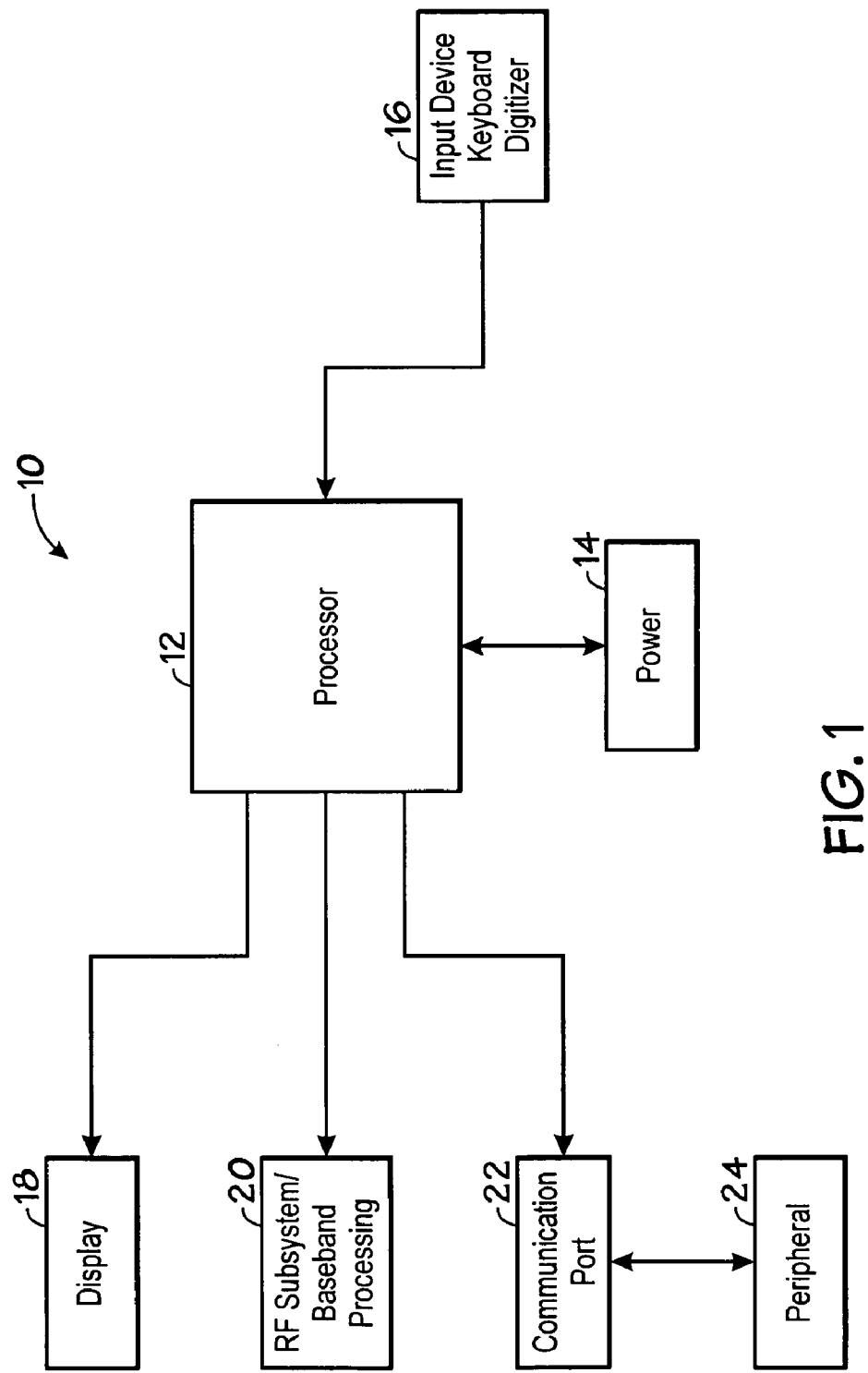
FIG. 1 illustrates a block diagram of an exemplary processor-based device in accordance with the present technique.

Turning now to the drawings, and referring initially to FIG. 1, a block diagram depicting an exemplary processor-based device, generally designated by the reference numeral 10, is illustrated. The device 10 may be any of a variety of different types, such as a computer, pager, cellular telephone, personal organizer, control circuit, etc. In a typical processor-based device, a processor 12, such as a microprocessor, controls many of the functions of the device 10.

The device 10 typically includes a power supply 14. For instance, if the device 10 is portable, the power supply 14 would advantageously include permanent batteries, replaceable batteries, and/or rechargeable batteries. The power supply 14 may also include an A/C adapter, so that the device may be plugged into a wall outlet, for instance. In fact, the power supply 14 may also include a D/C adapter, so that the device 10 may be plugged into a vehicle's cigarette lighter, for instance.

Various other devices may be coupled to the processor 12, depending upon the functions that the device 10 performs. For instance, a user interface 16 may be coupled to the processor 12. The user interface 16 may include an input device, such as buttons, switches, a keyboard, a light pin, a mouse, and/or a voice recognition system, for instance. A display 18 may also be coupled to the processor 12. The display 18 may include a LCD display, a CRT, LEDs, and/or an audio display. Furthermore, a RF subsystem/baseband processor 20 may also be coupled to the processor 12. The RF subsystem/baseband processor 20 may include an antenna that is coupled to a RF receiver and to a RF transmitter (not shown). A communication port 22 may also be coupled to the processor 12. The communication port 22 may be adapted to be coupled to a peripheral device 24, such as a modem, a printer, or a computer, for instance, or to a network, such as a local area network or the Internet.

Figure 2:
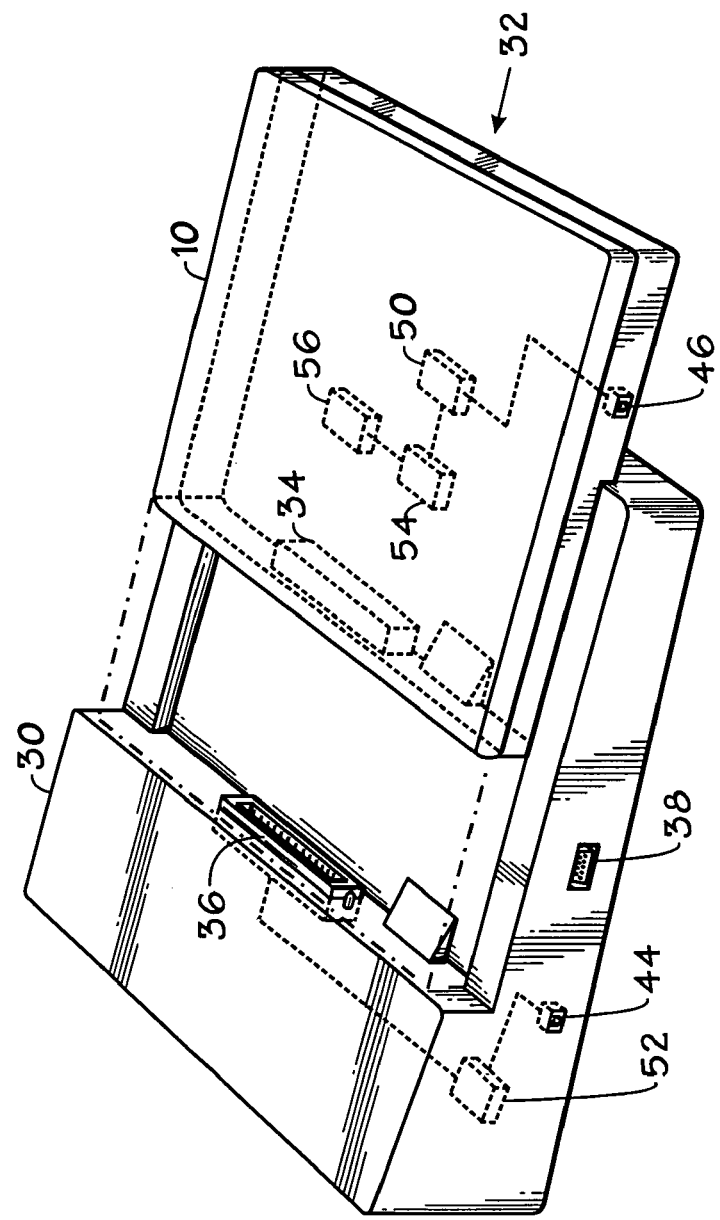
FIG. 2 illustrates an exemplary portable device with a docking station.

The device 10 may be able to dock or connect into a larger unit, such as, a master housing unit or docking station. FIG. 2 illustrates a simplified diagram of a typical portable device 10 connecting into a docking station 30. The portable device 10 may be a computer, a laptop, a handheld processor, or any other similar component based device. The portable device 10 generally includes a portable connection port 34 that enables a physical link between the docking station 30 and the portable device 10. The portable connection port 34 may be connected to a switching device 54, a physical layer controller 50, a portable network connector 46, or a network controller 56. The docking station 30 includes a docking connection port 36 that connects to the components in the docking station 30, such as a physical layer controller 52 or a docking network connector 44. To make the connection between the portable device 10 and the docking station 30, the portable device 10 moves in the direction of the arrow 32 to couple the portable connection port 34 with the docking connection port 36. With the portable device 10 connected into the docking station 30, the portable device 10 uses a peripheral port 38 to gain access to the docking station's 30 peripheral attachments. The peripheral port 38 may connect a mouse, a monitor, a printer, a scanner, or other devices into the docking station 30 to enable communication with the portable device 10. The use of these peripheral attachments may be beneficial to the user.

Another type of connection that the portable device 10 and docking station 30 generally utilized is a network connection. The docking station 30 may have a docking network connector 44 that allows the portable device 10 to communicate with other devices when the portable device 10 is coupled with the docking station 30. The docking network connector 44 may be an optical, a copper, or a wireless interface that communicates with the network. The docking network connector 44 may connect to other components in the docking station 30, such as a physical layer controller 52. Likewise, the portable device 10 connects to the network through a portable network connector 46 contained within the portable device 10. The portable network connector 46 may be an optical, a copper, or a wireless interface as well. The portable network connector 46 may connect to components, such as the physical layer controller 50, the switching device 54, or the network controller 56. The network may be token ring, FDDI, ATM, Ethernet, wireless, or any other method of communication between systems.

Figure 3:
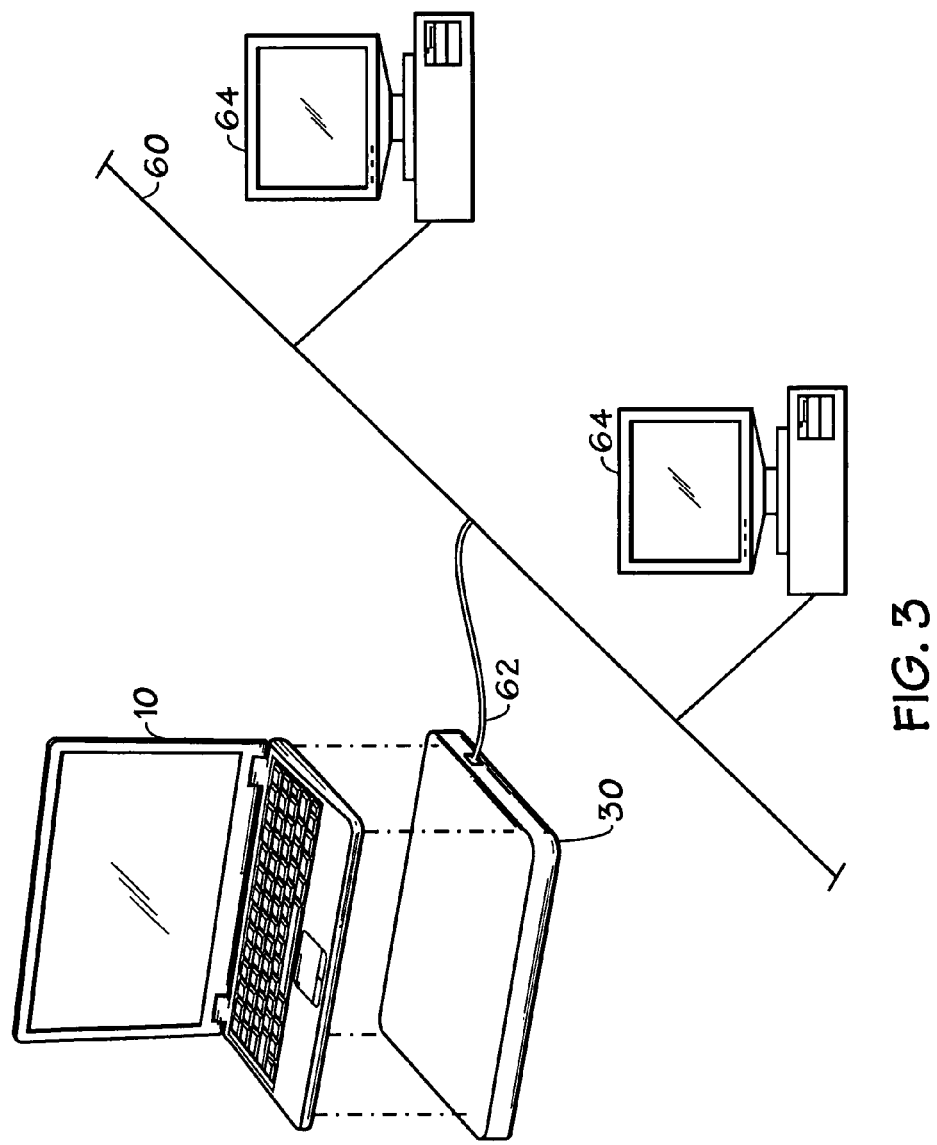
FIG. 3 illustrates an exemplary portable device connected to docking station and connected to a network environment.

To allow the portable device 10 and the docking station 30 to interface with other systems, a network 60 illustrated in FIG. 3 provides a simplified diagram of devices that communicate with each other. Servers 64 or other systems 66 may communicate with other devices that are connected to the network 60. A network connection enables the portable device 10 to communicate and exchange information with the other devices on the network 60. The portable device 10 may be connected to the network 60 through the portable network connector 46 or through the docking network connector 44. The physical link 62 is the media that the portable device 10 or the docking station 30 uses to transmit a signal to the other devices on the network 60. The physical link 62 may be a wireless, a copper, or an optical means of communication. When the docking station 30 and the portable device are coupled together, the signals are sent over the docking network connector 44 or the portable network connector 46 through a physical link 62. When the portable device 10 is not connected to the docking station, the signals are sent over the portable network connect 46 through the physical link 62. The network 60 may range from one server 64 or computer system 66 to the entire Internet. Of course, the network 60 may include various software and hardware not illustrated, such as a cable, hub, switch, router, etc.

Figure 4:
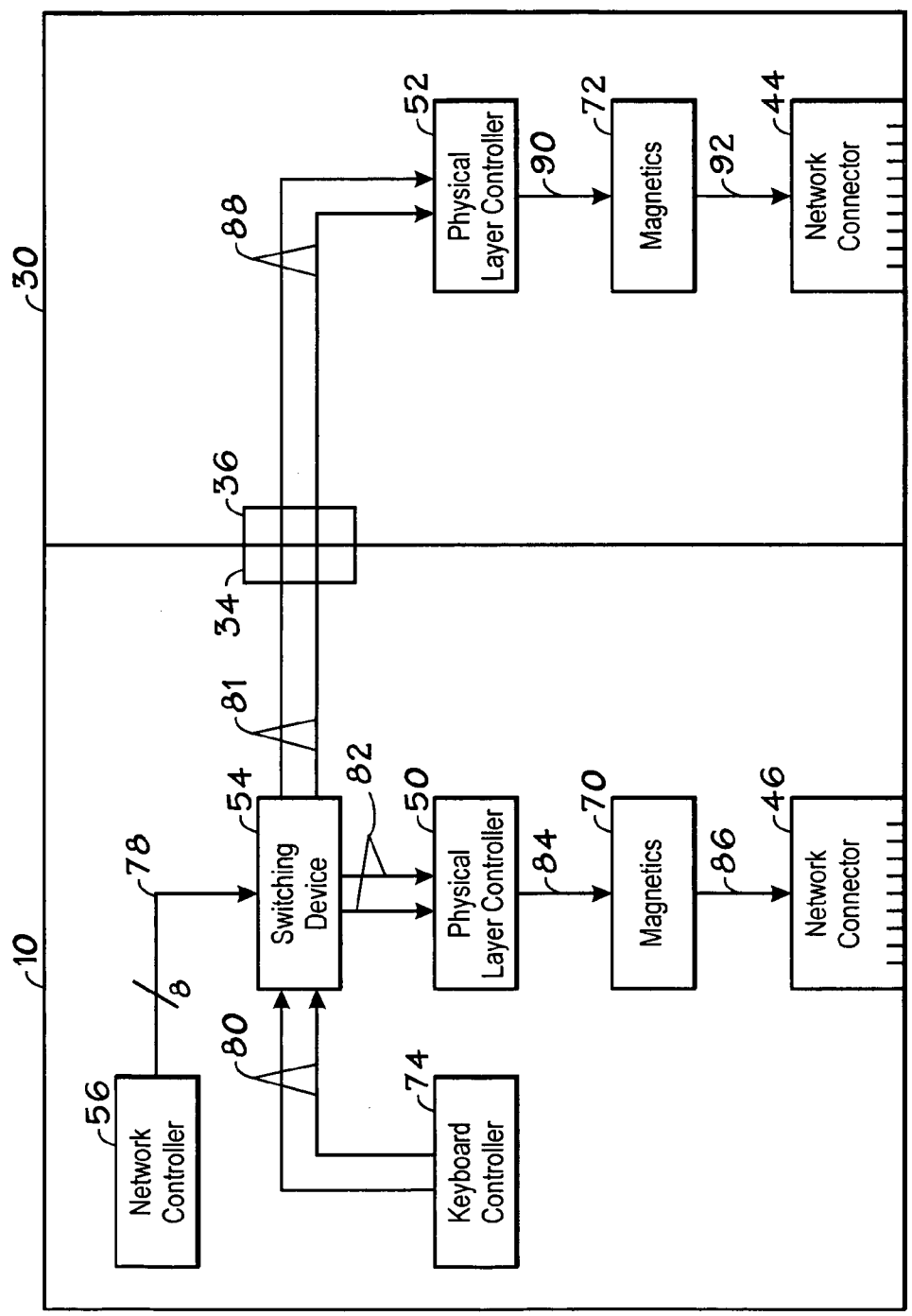
FIG. 4 illustrates a block diagram of components of an exemplary portable device and docking station.

FIG. 4 illustrates a block diagram of certain network components in the portable device 10 and docking station 30. The network controller architecture generally includes the network controller 56 and the physical layer interface. For the portable device 10, the network controller architecture includes a network controller 56, a physical layer controller 50, a magnetics component 70, and a docking network connector 44. For the docking station 30, the network controller architecture includes a physical layer controller 52, a magnetics component 72, and a portable network connector 46. The network controller 56 is not duplicated within the housing of the docking station 30. The network controller 56 connects to a switching device 54 through a physical connection 78. The switching device 54 allows the network controller 56 to be shared between the physical layer interfaces of the portable device 10 and the docking station 30. That is, the switching device 54 may transfer access between the network connectors 44 and 46 to allow the portable device 10 to continue network access without restarting the system. The network controller 56 communicates through a physical connection 78 by using a Media Management Interface (MMI). The MMI signals may be control signals, such as signals from the port replicator indicating a dock/undocked situation, multiplexor signals indicating which port is active, or a reset signal used to drive the LAN_SYNC signal. By communicating with the switching device 54, the network controller 56 may interface with other components that are connected to the switching device 54 and use the MMI signals to control the communication of the network. The physical connection 78 may be copper, optics, or another type of media that allows the components to be able to communicate.

Along with the connection to the network controller 56, the switching device 54 connects to the keyboard controller 74, the docking physical layer controller 52, and the portable physical layer controller 50. The switching device 54 may be a FET based switch or another type of switch. The keyboard controller 74 connects to the switching device 54 through a physical connection 80. The physical connection 80 between the switching device 54 and the keyboard controller 74 is typically a MMI connection using select and reset signals. The physical connection 80 passes signals that allow the switching device 54 to know if the portable device 10 is connected to the docking station 30 or running independently. By sending these signals, the switching device 54 can select the portable device 10 or docking station 30 as the active network connection. Once selected as the active network connection, the signals from the network controller 56 can be routed to the appropriate physical layer controller 50 or 52. Along with the docking status signal, other signals may be sent over the physical connection 80 to control other features of the system. The physical connection 82 between the switching device 54 and the portable physical layer controller 50 may be MMI with reset signals. Over physical connection 82, signals are sent to control the portable network connector 46 when it is the active network connection. Likewise, the physical connection 81 connects to the portable connection port 34 to the switch 54. The portable connection port 34 is coupled to the docking connection port 36. The portable connection port 34 and docking connection port 36 are the single connection between the docking station 30 and the portable device 10. These connection ports enable the docking station 30 components and the portable device 10 components to be physically connected with each other. The physical connection 88 connects the docking connection port 36 to the docking physical layer controller 52. Once the portable connection port 34 and the docking connection port 36 are coupled, the signals from the switching device 54 are sent to the physical layer controller 52. The physical connections 88 and 81 between the switching device 54 and the docking physical layer controller 52 may be MMI with reset signals. Over physical connections 88 and 81, signals are sent to control the docking station's 30 active network connection when the portable device 10 is utilizing the docking network connector 44 to communicate to the network 60.

For the physical layer interface, the physical layer controllers 50 and 52 are the interface to the switching device 54. For the portable device 10, the portable physical layer controller 50 connects to the magnetics component 70 through the physical connection 84. Likewise, the magnetics component 70 connects to the portable network connector 46 through the physical connection 86. The physical connections 84 and 86 allow the physical layer controller 50 to communicate with the network 60. The typical signals sent through the physical connections 84 and 86 are MMI. An alternative configuration may have the physical layer controller 50 connecting through physical connection 84 to the portable network connector 46 using MMI signals. The portable network connector 46 is the final component that makes the connection to the network media. The portable network connector 46 connects to the physical link 62 to allow network signals to communicate with the portable device 10. The portable network connector 46 may be a copper, optics, or wireless connector.

For the docking station 30, the docking physical layer controller 52 connects to the magnetics component 72 through the physical connection 90. Also, the magnetics component 72 connects to the docking network connector 44 through the physical connection 92. The physical connections 90 and 92 allow the physical layer controller 52 to communicate with the network 60. The typical signals sent through the physical connection 90 and 92 are MMI. An alternative configuration may have the physical layer controller 52 connecting through physical connection 90 to the docking network connector 44 using MMI signals. The docking network connector 44 is the final component that makes the connection to the network media. The docking network connector 44 connects to the physical link 62 to allow network signals to communicate with the network controller 56 in the portable device 10. The docking network connector 44 may be a copper, optics, or wireless connector.

In another possible configuration, the network controller 56 may be contained within the docking station 30 instead of the portable device 10. By locating the network controller 56 within the docking station 30, many portable devices 10 may share a single docking station 30. For instance, in a manufacturing environment, the docking station 30 may be a single unit with the network controller 56, while each portable device 10 may have the inexpensive physical layer interface components without the network controller 56. In this situation, the portable devices 10 would be manufactured at a lower cost and still have a redundant network connection. With the portable device 10 having the physical layer interface components, it allows the user to continue to be able to access the network 60 with a failure of the physical layer interface on the docking station 30. With regard to cost, the portable device 10 may be manufactured at a lower cost by removing the network controller 56 and housing it within the docking station 30. This alternative approach allows for a reduced cost solution that maintains the flexibility of dual network components.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A portable device and a docking station system comprising:
   a portable device comprising:
      a portable network connector;
      a portable connection port;
      a switch operably coupled to the portable network connector and the portable connection port; and
      a network controller operably coupled to the switch, wherein the switch routes signals from the network controller to one of the portable network connector or the portable connection port; and
   a docking station not including a docking station-side network controller, the docking station comprising:
      a docking network connector; and
      a docking connection port operably coupled to the docking network connector, wherein the docking connection port is configured to couple with the portable connection port for receiving the signals from the network controller.

2. The claim as set forth in claim 1, wherein the portable device comprises a portable computer.

3. The claim as set forth in claim 1, wherein a link is operably coupled between the portable network connector and the switch.

4. The claim as set forth in claim 3, wherein the link comprises a physical layer controller.

5. The claim as set forth in claim 1, wherein the switching device determines which of the portable network connector or the docking network connector is connected to the network controller.

6. The claim as set forth in claim 5, wherein a network connection may be transferred between the network connectors while allowing continued network operation without restarting the system.

7. A docking station comprising:
   a network interface consisting essentially of:
      a network connector;
      a docking connection port operably coupled to the network connector, wherein the docking connection port is operable to receive signals such that when a portable device is coupled to the docking connection port and the network connector is coupled to a network, network signals pass between the network and the portable device via the network connector under control of a network controller of the portable device; and
      a physical layer controller.

8. The claim as set forth in claim 7, wherein a link is operably coupled between the network connector and the docking connection port.

9. The claim as set forth in claim 7, wherein the network connector is operably coupled to a wireless network.

10. A method of operation for a portable device coupled to a docking station, the method comprising the acts of:
    (a) transmitting signals from a device-side network controller in the portable device to a switch;
    (b) transmitting the signals from the switch to a network connector of the portable device in response to the network connector of the portable device being coupled to a network; and
    (c) transmitting the signals from the switch to a network connector in the docking station in response to the network connector in the docking station being coupled to a network, wherein the docking station does not include a docking station-side network controller.

11. The method as recited in claim 10, wherein act (b) comprises the act of transmitting the signals from the switch through a physical layer controller to the network connector in the portable device.

12. The method as recited in claim 10, wherein act (c) comprises the act of transmitting the signals from the docking connection port through a physical layer controller to the network connector in the docking station.

13. A portable device comprising:
    a network connector;
    a network controller configured to communicate with at least one device on a network external to the portable device;
    a connection port configured to couple to a corresponding connection port of a docking station having no network controller; and
    a switch operably coupled to the network controller, the network connector, and the connection port of the portable device, the switch being configured to route signals from the network controller to the network connector when the portable device is not coupled to the docking station and to route signals from the network controller to the connection port when the portable device is coupled to the docking station to provide communication between the portable device and the network via a connector of the docking station.

14. The portable device as set forth in claim 13, wherein the portable device comprises a portable computer.

15. The portable device as set forth in claim 13, comprising a physical layer controller operably coupled between the network controller and the network connector.

16. The portable device as set forth in claim 13, wherein the network connector is an Ethernet connector.

17. The portable device as set forth in claim 13, comprising a physical layer controller coupled between the network connector and the network controller, wherein the physical layer controller is configured to be utilized by the network controller to access the network via the network connector.

18. A system comprising:
    a portable device comprising:
        a portable network connector;
        a portable connection port;
        a network controller coupled to the portable network connector and the portable connection port and configured to communicate with at least one device on a network external to the system via the portable network connector or the portable connection port; and
        a switch operably coupled between the network controller and the portable network connector and between the network controller and the portable connection port, the switch configured to route signals from the network controller to the network connector when the portable device is in an undocked condition and configured to route signals from the network controller to the portable connection port when the portable device is in a docked condition; and
    a docking station not including a docking station-side network controller, the docking station comprising:
        a docking network connector;
        a docking connection port configured to:
            couple the portable device to the docking station via the portable connection port; and provide access to a communication path from the network controller to the docking network connector.

19. The system as set forth in claim 18, comprising a portable physical layer controller coupled between the portable network connector and the network controller, wherein the portable physical layer controller is configured to provide network access for the network controller to the network via the portable network connector.

20. The system as set forth in claim 19, comprising a docking physical layer controller coupled between the docking network connector and the network controller, wherein the docking physical layer controller is configured to provide network access for the network controller via the docking network connector.

* * * * *